United States Patent Office 3,182,078
Patented May 4, 1965

---

3,182,078
PREPARATION OF 1,4-CYCLOHEXADIENE-1,4-DICARBOXYLIC ACID
Gerhard F. Ottmann, Hamden, Conn., assignor to Olin Mathieson Chemical Corporation, a corporation of West Virginia
No Drawing. Filed May 3, 1962, Ser. No. 192,065
2 Claims. (Cl. 260—514)

This invention relates to the preparation of 1,4-cyclohexadiene-1,4-dicarboxylic acid. More particularly, this invention relates to the production of 1,4-cyclohexadiene-1,4-dicarboxylic acid from an alkyl ester of 2,5-dihydroxy-hexahydro-terephthalic acid.

A wide variety of processes have been proposed in the art for the preparation of 1,4-cyclohexadiene-1,4-dicarboxylic acid. For example, it has been proposed to prepare this compound by dehydrating dimethyl-2,5-dihydroxy-hexahydro-terephthalate in the liquid phase utilizing dehydrating agents such as formic aid, potassium hydrogen sulfate, hydrochloric acid, sulfuric acid, etc. Processes have also been suggested for the preparation of 1,4-cyclohexadiene-1,4-dicarboxylic acid in which the diol is dehydrated in the vapor phase in the presence of a dehydration catalyst, such as zinc oxide, alumina, alumni-silica gels, etc.

In the process of this invention ethylene glycol is heated with an alkyl ester of 2,5-dihydroxy-hexahydro-terephthalic acid (I) and 1,4-cyclohexadiene-1,4-dicarboxylic acid is recovered from the resulting reaction mixture.

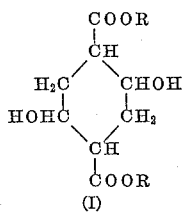

(I)

In the formula, R is an alkyl radical having 1 to 3 carbon atoms. In carrying out the process of this invention the molar ratio of the ethylene glycol to the ester of 2,5-dihydroxy-hexahydro-terephthalic acid in the starting or initial reaction mixture can be varied from about 10:1 to about 30:1 and preferably from 10:1 to about 15:1. The reaction is conveniently carried out at atmospheric pressure although pressures from sub-atmospheric to pressures as high as about 5 to 10 atmospheres may be employed if desired. In general the reaction temperature will range from about 170° C. to 250° C. depending upon the particular reaction conditions employed. Preferably the reaction is carried out at reflux temperature. Suitable alkyl esters of 2,5-dihydroxy-hexahydro-terephthalic acid which can be employed in the process of this invention include, for example, the dimethyl, diethyl and dipropyl esters of 2,5-dihydroxy-hexahydro-terephthalic acid. The reaction time generally will be from about 10 to about 30 hours or more. If the product, which precipitates during the course of the reaction, is removed as the reaction proceeds, the reaction time can be shortened considerably. The alkanol formed during the reaction, which is methanol when the dimethyl-2,5-dihydroxy-hexahydro-terephthalate is utilized as the starting ester, is retained in the reaction flask and prevents the formation of a polymer. At the conclusion of the reaction the product, 1,4-cyclohexadiene-1,4-dicarboxylic acid, can be conveniently separated from the reaction mixture by a variety of methods, such as by filtration, decantation, or by centrifugation.

Although the reaction of this invention proceeds without the aid of a catalyst, it has been found that the rate of reaction can be accelerated by the addition of from about 0.1 to about 1.0 percent by weight of a suitable catalyst based on the weight of the ester used. Useful catalysts are organic derivatives of the polyfunctional inorganic acids, like methane-sulfonic acid, benzene sulfonic acid, p-toluene-sulfonic acid, naphthalene-disulfonic acid, phenyl-phosphonic acid, and p-tolyl boronic acid, p-toluene sulfonyl chloride, etc.

The product of this invention, 1,4-cyclohexadiene-1,4-dicarboxylic acid, can be dehydrogenated or oxidized to yield terephthalic acid.

This invention is further illustrated by the following example.

*Example I*

An amount of 116 grams (0.5 mole) of dimethyl-2,5-dihydroxy - hexahydro - terephthalate, 372 grams (6.0 moles) of ethylene glycol, and 1.16 grams of p-toluene sulfonic acid were introduced into a reaction flask and the mixture refluxed for 23 hours. The resulting 1,4-cyclohexadiene-1,4-dicarboxylic acid, a white precipitate, was removed from the reaction mixture by filtration, washed free of the glycol and recrystallized from water. A yield of 74 grams of 1,4 - cyclohexadiene - 1,4 - dicarboxylic acid was obtained.

A solution of 15.5 grams of the acid product and 3 grams of concentrated sulfuric acid in 100 ml. of methyl alcohol was refluxed for 30 minutes. After cooling to ice temperature, the resulting crystals of dimethyl-1,4-cyclohexadiene-1,4-dicarboxylic acid were separated by filtration and purified by recrystallization from methanol. The melting point of the dimethyl ester thus prepared was found to be 126°–127° C. which corresponds favorably with the value reported in the literature.

What is claimed is:
1. A method for the preparation of 1,4-cyclohexadiene-1,4-dicarboxylic which consists in heating about 10 to about 20 moles of ethylene glycol with 1 mole of the compound:

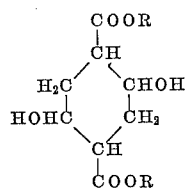

wherein R is an alkyl group having 1 to 3 carbon atoms, at a temperature of from about 170° C. to about 250° C. and recovering 1,4-cyclohexadiene-1,4-dicarboxylic acid from the reaction mixture, said reaction being conducted in the presence of from 0.1 to about 1.0 percent by weight of a catalyst based on the weight of the said compound, the said catalyst being selected from the group consisting of methane sulfonic acid, benzene sulfonic acid, and p-toluene sulfonic acid, naphthalene disulfonic acid, phenyl-phosphonic acid, p-tolyl boronic acid and p-toluene sulfonyl chloride.

2. The method for the preparation of 1,4-cyclohexadiene-1,4-dicarboxylic acid which consists in heating at reflux temperature about 10 to about 30 moles of ethylene glycol with 1 mole of dimethyl-2,5-dihydroxy-hexahydroterephthalate in the presence of from about 0.1 to about 1.0 percent by weight of p-toluene sulfonic acid based on the weight of the ester starting material and recovering 1,4-cyclohexadiene-1,4-dicarboxylic acid from the reaction mixture.

References Cited by the Examiner
UNITED STATES PATENTS

| | | | |
|---|---|---|---|
| 2,734,077 | 2/56 | Smith | 260—514 |
| 2,782,221 | 2/57 | Reed | 260—514 XR |
| 2,782,222 | 2/57 | Thompson | 260—514 XR |
| 2,782,224 | 2/57 | Smith | 260—514 XR |
| 2,782,225 | 2/57 | Jones | 260—514 XR |

LORRAINE A. WEINBERGER, *Primary Examiner.*
LEON ZITVER, *Examiner.*